No. 829,516. PATENTED AUG. 28, 1906.
H. EARLE.
DEVICE FOR REMOVING ORE SLIMES FROM SETTLING TANKS.
APPLICATION FILED NOV. 3, 1905.
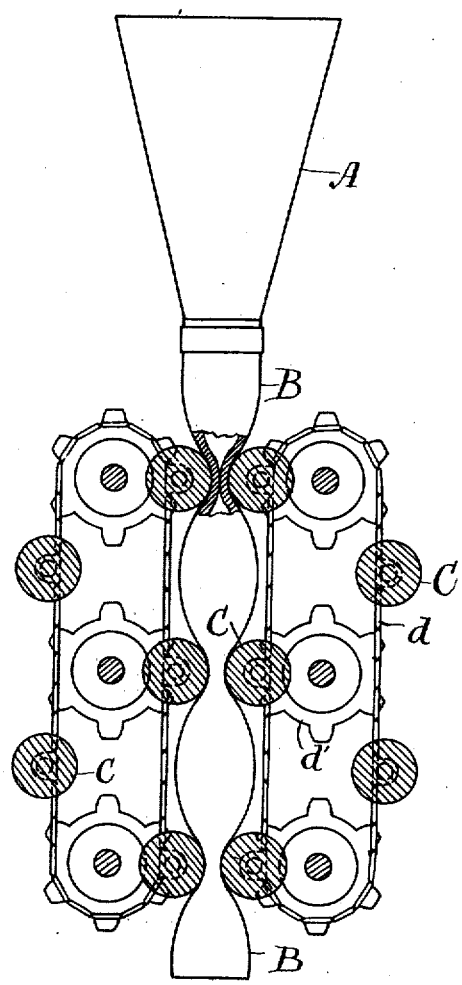
Witnesses
Mary A. Donaldson
Edith M. Hinckley
Inventor
Henry Earle
by S. W. Bates
Attorney

UNITED STATES PATENT OFFICE.

HENRY EARLE, OF DENVER, COLORADO.

DEVICE FOR REMOVING ORE-SLIMES FROM SETTLING-TANKS.

No. 829,516.　　　Specification of Letters Patent.　　　Patented Aug. 28, 1906.

Application filed November 3, 1905. Serial No. 285,776.

*To all whom it may concern:*

Be it known that I, HENRY EARLE, a citizen of the United States of America, and a resident of Denver, county of Denver, Colorado, have invented certain new and useful Improvements in Devices for Removing Ore-Slimes from Settling-Tanks, of which the following is a specification.

My invention relates to a device for removing slimes or finely-crushed ore from the bottom of a tank or vessel containing water or a chemical solution in which the slimes or crushed ore is held in suspension and slowly settled by gravity.

One of the chief metallurgical difficulites in all processes for extracting valuable metals from their ores by means of chemical solutions is in separating the clear solution or chemical liquid containing the metal in solution from the very finely crushed ore, termed "slimes." The coarser particles of crushed ore, termed "sands," present no difficulty in separating them from solutions, as they percolate or drain easily when placed in proper tanks arranged for the purpose.

In the treatment of ores by the cyanid process it is often necessary to crush ores very finely—in other words, to make as much slimes as possible—in order to extract a high percentage of the valuable metals. This crushing may be done in water alone or in water containing cyanid of potash in solution.

If the ore is crushed in water, as in a stamp-mill or tube-mill, and passed over amalgamating-plates, it is essential to remove as much of the water as possible before applying a solution of cyanid of potash or other chemical to further extract the values.

The object of my invention is to construct a mechanical device to be attached to the bottom of a settling-tank for the purpose of removing the slimes with as little combined water or solution as possible and with the further purpose of making the operation continuous. It consists, essentially, of a flexible tube or hose applied to the discharge-pipe of a tank, with means, preferably in the form of rollers, for laterally compressing the tube at one or more points and progressively moving the point or points of pressure downward, by which successive portions of the slimes are cut off and rolled downward to the end of the tube and then discharged, the operation being, in effect, a kind of stripping process.

My device if attached to a tank into which is flowing finely-crushed ore and water from a stamp-mill will remove from the bottom of the tank the crushed ore with very little contained water and at the same time permit clear water to flow over the top of the tank to be used over again. The crushed ore being deprived of most of the water is then in the best condition for further treatment, if required.

Should the ore be crushed in a solution of cyanid of potash or other chemical and conveyed to a cone-bottomed settling-tank, my device will permit of the removal of the crushed ore from the bottom of the cone and allow the clear cyanid or other chemical solution to flow over the top of the tank, ready for the precipitation-boxes. The thickened ore or slimes removed from the tank can then be again mixed with cyanid solution, agitated in order to mix thoroughly, and separated in another tank equipped with my device, this process being repeated as often as necessary.

In present practice a great many expensive settling-tanks are used, and when the crushed ore or slimes have settled to the bottom the clear solution is decanted off. It is not possible to remove as much of the solution by this method as can be done by the use of my device; nor can the process of washing and removal of the clear solution be made continuous.

There are other metallurgical processes, such as the separation of ores from their gangue by concentration, when it is often advantageous to remove surplus water from the crushed ore in order to facilitate further treatment. My device will enable this surplus water to be easily removed and deliver the thickened pulp in the best possible condition for further treatment.

I illustrate my invention by means of the accompanying drawing, which shows a general vertical section showing the rolls in section and the flexible tube in elevation.

In the drawing, A represents the hopper or cone-shaped bottom of the settling-tank, and B is a flexible tube or hose, preferably of heavy rubber, connected onto the outlet-pipe of the tank and extending vertically downward. The slimes as they settle into the pipe are removed by impinging surfaces, which compress it at one or more points and move downward with a rolling motion, ejecting the slimes from the lower end of the pipe. As here shown, I make use of a series of rolls C C, arranged in pairs on each side of the pipe and journaled to endless sprocket-chains $d\ d$, running over sprocket-wheels $d'\ d'$. There are two rolls in each set, one on each side of the pipe, and the corresponding rolls of each set come together and pinch or compress the pipe between them as they slowly move downward. The rolls are evenly spaced on the sprocket-chains, and they are sufficiently far apart so that at least two sets will compress the pipe all the time. Motion is imparted to the sprocket-chains, so as to give the rolls as they come to the pipe a downward motion at the same velocity.

In operation the slimes or crushed ore is conveyed with water or a chemical solution into the cone-bottomed tank and slowly settles in a more or less solid form into the rubber pipe and cone-bottom. When the shafts carrying the sprocket-wheels and chain are slowly turned, the rollers carried on the chain grip and compress the rubber pipe, rolling downward and carrying the settled slimes and ore contained in the rubber pipe with them. The next following pair of rollers grip and compress the rubber pipe at some fixed distance above the first set, and the slimes or settled ore is thus being continuously rolled downward and delivered at the open end of the rubber pipe.

It is preferable to have the rubber pipe made of a good quality of rubber, perfectly smooth on the inside, and it may be covered with canvas on the outside. The rubber should be thick enough and elastic enough to spring out and assume its round shape as soon as released from the compression of the traveling rollers, as this helps to draw the slimes into the rubber pipe and prevents the slimes from adhering to the inside of the cone.

Should the mechanism be stopped at any point, no slimes or water will escape from the tank, as the rollers compress the pipe tightly and prevent any discharge except when moving. The slimes or crushed ore as fast as discharged from the rubber pipe are ready for further treatment—that is, they can again be mixed with water or chemical solution, agitated, if necessary, delivered into another cone-bottomed tank equipped with my device, and separated as before, this process being repeated as often as desired and being a continuous one. The solution or water is allowed to overflow from the top of the tank, ready for precipitation of its contained values or use over again.

It is evident that other means than the rollers herein described may be used to compress the pipe at one or more points and to roll or squeeze out the contained slimes.

I claim—

1. In a device for removing ore-slimes from settling-tanks, the combination with the settling-tank of a flexible tube connected with the discharge-pipe and means for laterally compressing said tube at one or more points and for progressively moving the point or points of compression downward.

2. In a device for removing ore-slimes from settling-tanks, the combination with the settling-tank of a flexible tube connected with the discharge-pipe, one or more rollers laterally compressing said tube and means for moving said rollers downward.

3. In a device for removing ore-slimes from settling-tanks, the combination with the settling-tank of a flexible tube connected with the discharge-pipe, one or more pairs of rollers for grasping and compressing said tube and means for moving said rollers downward and returning them to the point of beginning.

4. In a device for removing ore-slimes from settling-tanks, the combination of a flexible tube connected with the discharge-pipe, a series of rollers on each side of said tube, an endless sprocket-chain in which said rollers are journaled, the corresponding rollers of each series forming pairs adapted to laterally compress the said tube and means for rotating said sprocket-chains to move said pairs of rollers downward.

Signed at Denver, Colorado, this 19th day of October, 1905.

HENRY EARLE.

Witnesses:
EDGAR A. LEUPOLD,
LLEWELYN JONES.